United States Patent
Johnson et al.

(10) Patent No.: US 10,589,746 B1
(45) Date of Patent: Mar. 17, 2020

(54) DECLUTCH CLUNK MITIGATION THROUGH TORQUE INTERVENTION

(71) Applicant: GM Global Technology Operations LLC, Detroit, MI (US)

(72) Inventors: Derek W. Johnson, Goodrich, MI (US); David T. Hanner, Milford, MI (US); Shaun D. Hoffman, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 16/113,604

(22) Filed: Aug. 27, 2018

(51) Int. Cl.
 *B60W 30/20* (2006.01)

(52) U.S. Cl.
 CPC ....... *B60W 30/20* (2013.01); *B60W 2030/203* (2013.01); *B60W 2030/206* (2013.01); *B60W 2510/0638* (2013.01); *B60W 2510/0657* (2013.01); *B60W 2510/104* (2013.01); *B60W 2510/1005* (2013.01); *B60W 2520/10* (2013.01); *B60W 2540/10* (2013.01); *B60W 2540/106* (2013.01); *B60W 2540/14* (2013.01); *B60W 2710/0666* (2013.01)

(58) Field of Classification Search
 CPC ......... B60W 30/20; B60W 2510/1005; B60W 2540/10; B60W 2520/10; B60W 2510/0657; B60W 2710/0666; B60W 2510/104; B60W 2030/203; B60W 2030/206; B60W 2540/14; B60W 2510/0638; B60W 2540/106
 See application file for complete search history.

(56) References Cited

U.S. PATENT DOCUMENTS

| | | | |
|---|---|---|---|
| 5,718,316 A * | 2/1998 | Gee | F16D 25/088 192/109 D |
| 6,574,535 B1 | 6/2003 | Morris et al. | |
| 7,171,299 B1 | 1/2007 | Stroh | |
| 7,881,846 B2 | 2/2011 | Reinke et al. | |
| 8,280,608 B2 * | 10/2012 | Senda | B60W 10/02 701/101 |
| 8,382,640 B2 * | 2/2013 | Takeuchi | F16D 48/02 477/175 |
| 8,843,284 B2 * | 9/2014 | Wolterman | B60W 10/02 477/111 |
| 10,407,074 B2 * | 9/2019 | Jang | B60W 30/19 |
| 2014/0106932 A1 * | 4/2014 | Kato | B60W 30/18018 477/83 |
| 2019/0226409 A1 * | 7/2019 | Hoffman | F02D 41/022 |
| 2019/0367009 A1 * | 12/2019 | Pettersson | B60W 20/15 |

* cited by examiner

*Primary Examiner* — David Hamaoui
(74) *Attorney, Agent, or Firm* — Quinn IP Law

(57) ABSTRACT

A method for mitigating clunk in a driveline of a vehicle system during a declutch event includes determining a current torque request of a prime mover based on an accelerator pedal position of an accelerator pedal of the vehicle system. The method includes determining a clutch pedal position and determining, via a controller, a clutch pedal speed based on a change of the clutch pedal position over time. The method further includes modifying, via the controller, the current torque request to obtain a modified torque request based on the clutch pedal position and the clutch pedal speed such that a stored potential energy in the driveline is minimized by a time that the clutch pedal of the vehicle system is disengaged during the declutch event.

19 Claims, 4 Drawing Sheets

| Factor to Multiply the Operator's Torque Request by to get the Modified Torque Request | Clutch Pedal Speed ||||||||||
|---|---|---|---|---|---|---|---|---|---|---|
| | Negative |||||| 0 | Positive ||||
| Pedal Depressed to the Floor | 1 | 1 | 1 | 1 | 1 | 1 | 1 | 1 | 1 | 1 |
| Clutch Pedal Position | 1 | 1 | 1 | 1 | 1 | 1 | 1 | 1 | 1 | 1 |
| | 0.5 | 0.5 | 0.5 | 0.5 | 0.5 | 0.5 | 1 | 1 | 1 | 1 |
| Clutch Disengage Point (Clutch can Transmit no Torque) | 0 | 0 | 0 | 0 | 0 | 0 | 1 | 1 | 1 | 1 |
| | 0 | 0 | 0 | 0 | 0 | 0.2 | 1 | 1 | 1 | 1 |
| | 0 | 0 | 0 | 0 | 0.2 | 0.4 | 1 | 1 | 1 | 1 |
| | 0 | 0 | 0 | 0.2 | 0.4 | 0.6 | 1 | 1 | 1 | 1 |
| | 0 | 0 | 0.2 | 0.4 | 0.6 | 0.8 | 1 | 1 | 1 | 1 |
| | 0 | 0.2 | 0.4 | 0.6 | 0.8 | 1 | 1 | 1 | 1 | 1 |
| | 0.2 | 0.4 | 0.6 | 0.8 | 1 | 1 | 1 | 1 | 1 | 1 |
| Pedal Released (Clutch Can Transmit Full Engine Torque) | 1 | 1 | 1 | 1 | 1 | 1 | 1 | 1 | 1 | 1 |

| Factor to Multiply the Operator's Torque Request by to get the Modified Torque Request | Clutch Pedal Speed | | | | | | | | | | | | | | | |
|---|---|---|---|---|---|---|---|---|---|---|---|---|---|---|---|---|
| | Negative | | | | | 0 | | | | | Positive | | | | | |
| Clutch Pedal Position | | | | | | | | | | | | | | | | |
| Pedal Depressed to the Floor | 1 | 1 | 1 | 1 | 1 | 1 | 1 | 1 | 1 | 1 | 1 | 1 | 1 | 1 | 1 | 1 |
| | 0.5 | 0.5 | 0.5 | 0.5 | 0.5 | 0.5 | 0.5 | 0.5 | 1 | 1 | 1 | 1 | 1 | 1 | 1 | 1 |
| Clutch Disengage Point (Clutch can Transmit no Torque) | 0 | 0 | 0 | 0 | 0 | 0 | 0 | 0 | 1 | 1 | 1 | 1 | 1 | 1 | 1 | 1 |
| | 0 | 0 | 0 | 0 | 0 | 0 | 0 | 0.2 | 1 | 1 | 1 | 1 | 1 | 1 | 1 | 1 |
| | 0 | 0 | 0 | 0 | 0 | 0 | 0.2 | 0.4 | 1 | 1 | 1 | 1 | 1 | 1 | 1 | 1 |
| | 0 | 0 | 0 | 0 | 0.2 | 0.2 | 0.4 | 0.6 | 1 | 1 | 1 | 1 | 1 | 1 | 1 | 1 |
| | 0 | 0.2 | 0.2 | 0.2 | 0.4 | 0.4 | 0.6 | 0.8 | 1 | 1 | 1 | 1 | 1 | 1 | 1 | 1 |
| | 0.2 | 0.4 | 0.4 | 0.4 | 0.6 | 0.6 | 0.8 | 1 | 1 | 1 | 1 | 1 | 1 | 1 | 1 | 1 |
| Pedal Released (Clutch Can Transmit Full Engine Torque) | 1 | 1 | 1 | 1 | 1 | 1 | 1 | 1 | 1 | 1 | 1 | 1 | 1 | 1 | 1 | 1 |

FIG. 5

DECLUTCH CLUNK MITIGATION THROUGH TORQUE INTERVENTION

INTRODUCTION

The present disclosure relates to a method and a system for declutch clutch mitigation through torque intervention.

Some vehicles include a manual transmission. By using a manual transmission, a vehicle operator may select the desired gear ratio to control the vehicle.

SUMMARY

The present disclosure describes a method for mitigating clunk in a driveline of a vehicle system during a declutch event. By executing this method, the vehicle system achieves a reduction in driveline torque to reduce stored potential energy prior to declutch. This reduction in stored potential energy mitigates change in angular momentum when a clutch opens, resulting in reduced levels of objectionable noise generation. Manual transmission vehicles, particularly performance oriented rear wheel drive configurations, have the capability to rapidly release potential energy stored in the driveline components as torsional "windup" via the driver opening the clutch abruptly. When such a maneuver occurs, the result is an objectionable clunk noise (caused by a vibration) as the now unconstrained clutch assembly torsionally oscillates and impacts against the limits of the various gear lashes in the driveline, often several times per event. Therefore, the term "clunk" means a noise (caused by vibration) that occurs when potential energy stored in the driveline components is rapidly realeased via the driver opening the clutch abruptly. The method involves torque intervention at the prime mover when a maneuver that may result in such a clunk result is detected. By quickly reducing torque to a neutral state before the clutch opens, the driveline is given a chance to "unwind" while the clutch is still constrained. Without any torque present across the clutch interface when the clutch opens, there is no potential energy present to generate the clunk event.

The method may include determining a current torque request of a prime mover based on an accelerator pedal position of an accelerator pedal of the vehicle system. The vehicle system includes an accelerator pedal position sensor coupled to the accelerator pedal to determine the accelerator pedal position. The method may further include determining a clutch pedal position based on a clutch position signal received from a clutch position sensor coupled to a clutch pedal of the vehicle system, and determining, via a controller, a clutch pedal speed based on a change of the clutch pedal position over time. The method may further include modifying, via the controller, the current torque request to obtain a modified torque request based on the clutch pedal position and the clutch pedal speed such that a stored potential energy in the driveline is minimized by a time that the clutch pedal of the vehicle system is disengaged during the declutch event of a manual transmission of the vehicle system. Further, the method includes controlling, via the controller, the prime mover to adjust an output torque thereof in accordance with the modified torque request.

In some aspects of the present disclosure, the method may include: determining a currently engaged transmission gear ratio; comparing the currently engaged transmission gear ratio with a predetermined gear ratio; determining, via the controller, that the currently engaged transmission gear ratio is the predetermined gear ratio; and in response to determining that the currently engaged transmission gear ratio is the predetermined gear ratio, modifying, via the controller, the current torque request to obtain the modified torque request.

The manual transmission includes a plurality of gear ratios, the plurality of gear ratios includes a first gear ratio and a second gear ratio. The predetermined gear ratio may be, but are no limited to, the first gear ratio and/or the second gear ratio. The first gear ratio is greater than the second gear ratio. The currently engaged transmission gear ratio may be determined based on a shift signal received from a shift-linkage position sensor that is coupled to a shift selector of the manual transmission. The currently engaged transmission gear ratio may be determined by dividing an engine speed of an internal combustion engine of the vehicle system by a transmission output shaft speed of a transmission output shaft of the manual transmission.

The method may further include determining a current vehicle speed of the vehicle system, comparing the current vehicle speed of the vehicle system with a predetermined speed value, determining that the current vehicle speed of the vehicle system is less than a predetermined speed value, and in response to determining that the current vehicle speed of the vehicle system is less than the predetermined speed value, modifying, via the controller, the current torque request to obtain the modified torque request.

The method may further include determining, via the controller, a current accelerator pedal speed of the accelerator pedal of the vehicle system based on a change of accelerator pedal position over time, comparing the current accelerator pedal speed with a predetermined speed threshold, determining that the current accelerator pedal speed is less than the predetermined speed threshold, and in response to determining that the current accelerator pedal speed is less than the predetermined speed threshold, modifying, via the controller, the current torque request to obtain the modified torque request.

The method may further include comparing the accelerator pedal position of the accelerator pedal of the vehicle system with a predetermined position value. The predetermined position value may be zero to indicate that a vehicle operator has released the accelerator pedal and the accelerator pedal is not depressed from its neutral position, and in response to determining that the accelerator pedal position is equal to the predetermined position value, determining, via the controller, a current accelerator pedal speed of the accelerator pedal of the vehicle system based on a change of accelerator pedal position over time.

The method may further include determining a currently engaged transmission gear ratio, comparing the currently engaged transmission gear ratio with a predetermined gear ratio, and determining, via the controller, that the currently engaged transmission gear ratio is the predetermined gear ratio. The manual transmission includes a plurality of gear ratios. The plurality of gear ratios includes a first gear ratio and a second gear ratio. The predetermined gear ratio may be a first gear ratio and the second gear ratio. The first gear ratio is greater than the second gear ratio. The currently engaged transmission gear ratio may be determined based on a shift signal received from a shift-linkage position sensor that is coupled to a shift selector of the manual transmission. The method may further include determining a current vehicle speed of the vehicle system, comparing, via the controller, the current vehicle speed of the vehicle system with a predetermined speed value, and determining that the current vehicle speed of the vehicle system is less than a predetermined speed value, wherein the current vehicle speed is determined based on a speed signal received from a transmission output shaft speed sensor that is coupled to the manual transmission. The method may further include determining, via the controller, a current accelerator pedal speed of the accelerator pedal of the vehicle system based on a change of accelerator pedal position over time, comparing the current accelerator pedal speed with a predetermined speed threshold, and determining that the current accelerator pedal speed is less than the predetermined speed threshold. The method may further include determining, via the controller, a current accelerator pedal speed of the accelerator pedal of the vehicle system based on a change of accelerator pedal position over time; and modifying, via the controller, the current torque request to obtain the modified torque request in response to: determining that the currently engaged transmission gear ratio is the predetermined gear ratio; comparing the current vehicle speed of the vehicle system with a predetermined speed value; determining that the current vehicle speed of the vehicle system is less than a predetermined speed value, determining that the current accelerator pedal speed is less than the predetermined speed threshold.

The present disclosure also relates to a vehicle system. The vehicle system includes a prime mover and a driveline including a manual transmission coupled to the prime mover. The prime mover includes a shift selector. The vehicle system further includes an accelerator pedal coupled to the prime mover, an accelerator pedal position sensor configured to determine an accelerator pedal position of the accelerator pedal, a clutch pedal coupled to the manual transmission, a clutch position sensor coupled to the clutch pedal to determine a clutch pedal position, and a controller in communication with the prime mover, the accelerator pedal position sensor, and the clutch position sensor. The controller is programmed to: determine a current torque request based on the accelerator pedal position of an accelerator pedal of the vehicle system; determine the clutch pedal position based on a clutch position signal received from the clutch position sensor; determine a clutch pedal speed based on a change of the clutch pedal position over time; and modify the current torque request to obtain a modified torque request as a function of the clutch pedal position and the clutch pedal speed such that a stored potential energy in the driveline is minimized by a time that the clutch pedal of the vehicle system is disengaged during a declutch event of the manual transmission of the vehicle system. The controller is also programmed to control the prime mover to adjust an output torque thereof in accordance with the modified torque request.

The controller may also be programmed to: determine a currently engaged transmission gear ratio; compare the currently engaged transmission gear ratio with a predetermined gear ratio; determine that the currently engaged transmission gear ratio is the predetermined gear ratio; and in response to determining that the currently engaged transmission gear ratio is the predetermined gear ratio, modify the current torque request to obtain the modified torque request. The manual transmission includes a plurality of gear ratios. The plurality of gear ratios includes a first gear ratio and a second gear ratio. The predetermined gear ratio may be the first gear ratio and/or the second gear ratio. The first gear ratio is greater than the second gear ratio.

The controller may be programmed to determine the currently engaged transmission gear ratio based on a shift signal received from a shift-linkage position sensor that is coupled to the shift selector of the manual transmission and/or determine the currently engaged transmission gear ratio by dividing an engine speed of an internal combustion engine of the vehicle system by a transmission output shaft speed of the manual transmission.

The controller may be programmed to: determine a current vehicle speed of the vehicle system; compare the current vehicle speed of the vehicle system with a predetermined speed value; determine that the current vehicle speed of the vehicle system is less than a predetermined speed value; and in response to determining that the current vehicle speed of the vehicle system is less than the predetermined speed value, modify the current torque request to obtain the modified torque request.

The controller may be programmed to: determine a current accelerator pedal speed of the accelerator pedal of the vehicle system based on a change of accelerator pedal position over time; compare the current accelerator pedal speed with a predetermined speed threshold; determine that the current accelerator pedal speed is less than the predetermined speed threshold; and in response to determining that the current accelerator pedal speed is less than the predetermined speed threshold, modify the current torque request to obtain the modified torque request.

In some aspect of the present disclosure, the vehicle system includes a prime mover configured to provide propulsion to the vehicle system and a driveline including a manual transmission coupled to the prime mover. The manual transmission includes a plurality of gear ratios. The manual transmission includes a shift selector configured to select among the plurality of gear ratios of the manual transmission. The plurality of gear ratios includes a first gear ratio, a second gear ratio, a third gear ratio, a fourth gear ratio, and a fifth gear ratio. The first gear ratio is greater than the second gear ratio. The manual transmission includes a transmission output shaft. The vehicle system includes a shift-linkage position sensor coupled to the shift selector of the manual transmission such that the shift-linkage position sensor is configured to determine a currently engaged gear ratio of the plurality of gear ratios. The shift-linkage position sensor is configured to generate a shift signal representative of the currently engaged gear ratio of the manual transmission. The vehicle system includes a transmission output speed sensor coupled to the transmission output shaft of the manual transmission such that the transmission output speed sensor is configured to monitor and measure a shaft speed of the transmission output shaft of the manual transmission. The transmission output speed sensor is configured to generate a shaft speed signal representative of the shaft speed of the transmission output shaft and a current vehicle speed of the vehicle system.

The vehicle system includes a clutch coupled between the prime mover and the manual transmission. The clutch is movable between an engaged position and a disengaged position. In the engaged position, the clutch interconnects the prime mover to the manual transmission such that torque is transmitted from the prime mover to the manual transmission. In the disengaged position, the clutch decouples the prime mover from the manual transmission such that no torque is transmitted between the prime mover and the manual transmission.

The vehicle system includes an accelerator pedal coupled to the prime mover, an accelerator position sensor coupled to the accelerator pedal such that the accelerator pedal position sensor is configured to determine an accelerator pedal position of the accelerator pedal, a clutch pedal coupled to the clutch, wherein actuation of the clutch pedal causes the clutch to move between the disengaged position and the engaged position, a clutch position sensor coupled to the clutch pedal such that the clutch position sensor is configured to determine a clutch pedal position, wherein the clutch position sensor is configured to generate a clutch position signal representative of the clutch pedal position, and a controller in communication with the shift-linkage position sensor, the transmission output speed sensor, the accelerator pedal position sensor, and the clutch position sensor.

The controller is programmed to: determine a currently engaged transmission gear ratio on the shift signal received from the shift-linkage position sensor; and compare the currently engaged transmission gear ratio with a predetermined gear ratio. The predetermined gear ratio is at least one of the first gear ratio or the second gear ratio. The controller is also programmed to determine that the currently engaged transmission gear ratio is the predetermined gear ratio; determine the current vehicle speed of the vehicle system based on the shaft speed signal received from the transmission output speed sensor; compare the current vehicle speed of the vehicle system with a predetermined speed value; determine that the current vehicle speed of the vehicle system is less than the predetermined speed value; determine a current accelerator pedal speed of the accelerator pedal of the vehicle system based on a change of the accelerator pedal position over time; compare the current accelerator pedal speed with a predetermined speed threshold; determine that the current accelerator pedal speed is less than the predetermined speed threshold; determine a current torque request based on the accelerator pedal position of the accelerator pedal of the vehicle system; determine the clutch pedal position based on the clutch position signal received from the clutch position sensor; and determine a clutch pedal speed based on a change of the clutch pedal position over time.

The controller is also programmed to modify the current torque request to obtain a modified torque request as a function of the clutch pedal position and the clutch pedal speed such that a stored potential energy in the driveline is minimized by a time that the clutch pedal of the vehicle system is disengaged during a declutch event of the manual transmission of the vehicle system in response to: determining that the currently engaged transmission gear ratio is the predetermined gear ratio; determining that the current vehicle speed of the vehicle system is less than the predetermined speed value; and determining that the current accelerator pedal speed is less than the predetermined speed threshold. The controller is also programmed to control the prime mover to adjust an output torque thereof in accordance with the modified torque request.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 5 is an exemplary table used for modifying a torque request.

DETAILED DESCRIPTION

Figure 1:
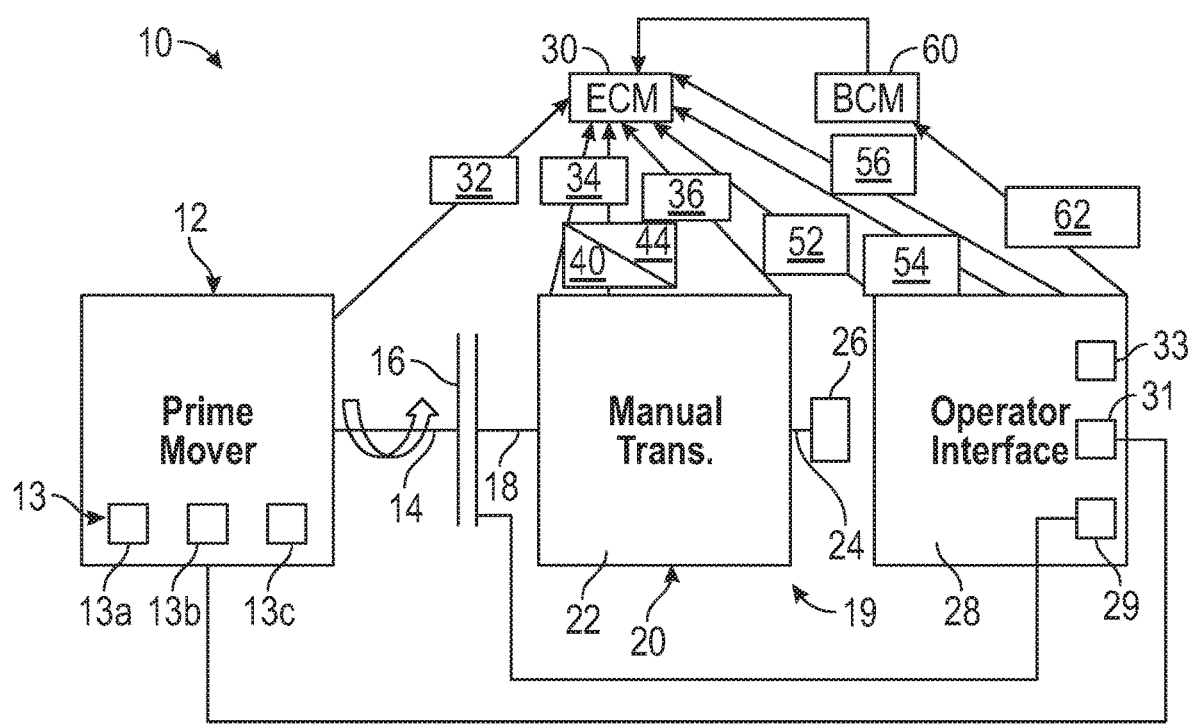
FIG. 1 is a block diagram of a vehicle system.
Figure 2:
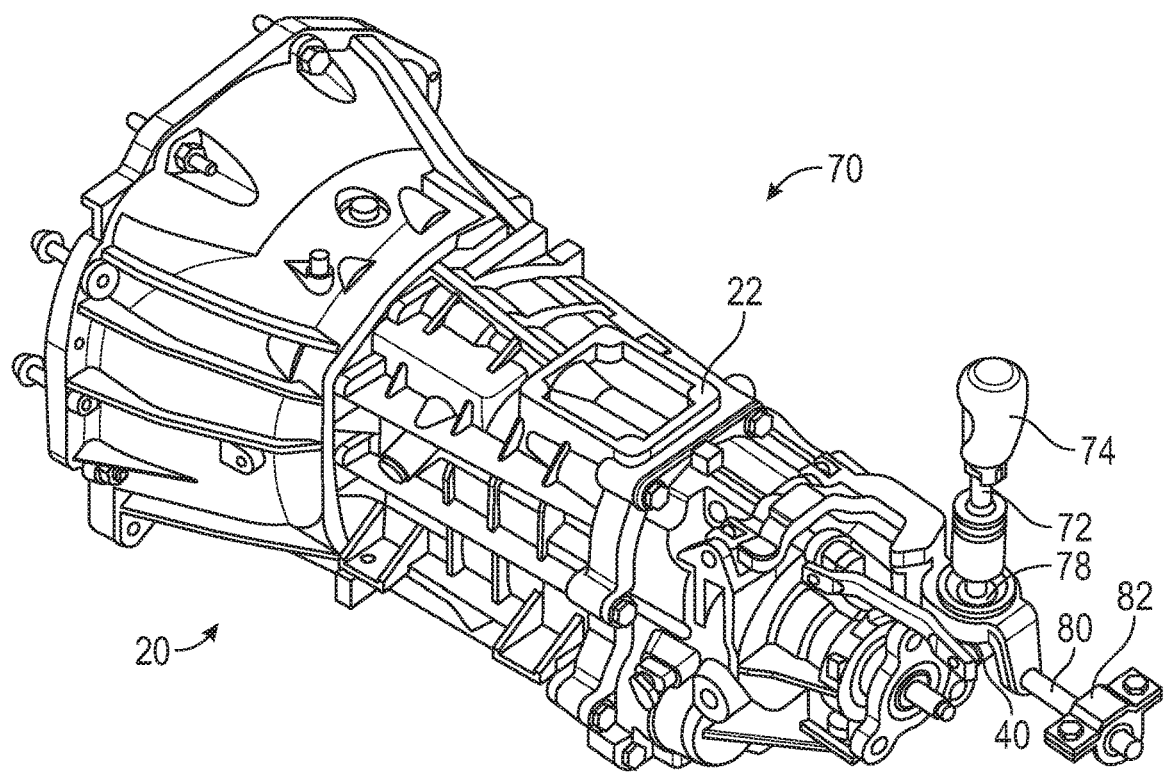
FIG. 2 is a schematic perspective view of a portion of a manual transmission of the vehicle system of FIG. 1.

Referring to the drawings, wherein like reference numbers correspond to like or similar components throughout the several figures, and beginning with FIGS. 1 and 2, a vehicle system 10 may be a motor vehicle having a manual transmission 20. The vehicle system 10 includes a prime mover 12, which may be a gasoline, Diesel or flex fuel engine, or a hybrid or electric power plant. The prime mover 12 is configure to provide propulsion to the vehicle system 10 and includes a mover output shaft 14 that drives a clutch 16 (e.g., a friction clutch) which is typically, though not necessarily, engaged and disengaged by the vehicle operator. The clutch 16 selectively provides drive torque to a transmission input shaft 18 of a manual transmission 20. Accordingly, the clutch 16 is selectively movable between an engaged position and a disengaged position. In the engaged position, the clutch 16 interconnects the prime mover 12 to the manual transmission 20, thereby allowing torque to be transmitted from the prime mover 12 to the manual transmission 20. In the disengaged position, the clutch 16 decouples the prime mover 12 from the manual transmission 20, thereby preventing torque from being transmitted between the prime mover 12 and the manual transmission 20. The manual transmission 20 include a housing 22 as well as shafts, gears and synchronizer clutches that cooperatively provide, for example, four, five, six or more forward speeds or gear ratios and reverse. In other words, the manual transmission 20 includes a plurality of gear ratios that may, for example, include a first gear ratio, a second gear ratio, a third gear ratio, a fifth gear ratio, and a sixth gear ratio. The first gear ratio is greater than the second gear ratio. The second gear ratio is greater than the third gear ratio. The third gear ratio is greater than the fourth gear ratio. The fourth gear ratio is greater than the fifth gear ratio. The fifth gear ratio is greater than the sixth gear ratio.

The manual transmission 20 includes a transmission output shaft 24 that is coupled to a final drive assembly 26. The final drive assembly 26 may include, for example, a propshaft, a differential assembly and a pair of drive axles. The clutch 16, the manual transmission 20, and the final drive assembly 26 are part of a driveline 19 of the vehicle system 10. An operator interface 28 generally includes those controls and devices under the control of and operated by the vehicle operator.

The vehicle system 10 also includes a plurality of electric and electronic sensors which provide real time data to an engine control module (ECM) 30 in communication with the prime mover 12. In the present disclosure, the ECM 30 may be simply referred to as the controller or the engine controller. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables.

The vehicle system 10 may include a tachometer 32 coupled to the prime mover 12 to provide an engine signal representing the current speed of the mover output shaft 14 of the prime mover 12. Although not necessary for clunk mitigation, the vehicle system 10 may include a transmission input speed sensor (TISS) 34 that senses the instantaneous speed of the input shaft 18 of the manual transmission 20. A transmission output speed sensor (TOSS) 36 senses the instantaneous speed of the transmission output shaft 24 of the manual transmission 20. The TOSS 36 is coupled to the transmission output shaft 18 of the manual transmission 20. As such, the TOSS 36 is configured to monitor and measure a shaft speed of the transmission output shaft 24 of the manual transmission 20. The TOSS 36 is configured to generate a shaft speed signal representative of the shaft speed of the transmission output shaft 24 and a current vehicle speed of the vehicle system 10.

A shift-linkage position sensor 40 includes an application specific integrated circuit 44, the data output of which indicates the current position of a shift selector 72 (FIG. 2). The shift-linkage position sensor 40 is coupled to the shift selector 72 of the manual transmission 20. As such, the shift-linkage position sensor 40 is configured to determine a currently engaged gear ratio of the plurality of gear ratios of the manual transmission 20. The shift-linkage position sensor 40 is configured to generate a shift signal representative of the currently engaged gear ratio of the manual transmission 20. A clutch position sensor 52 senses the position of a clutch pedal 29 and, hence, the position of the clutch 16. A rate of change of the clutch pedal position is calculated by the ECM 30 based on the change of the position of the clutch pedal 29 over time. A clutch pedal 29 is coupled to the clutch. Actuation of the clutch pedal 29 causes the clutch 16 to move between the disengaged position and the engaged position. The clutch position sensor 52 is coupled to the clutch pedal 29. As such, the clutch position sensor 52 is configured to determine the clutch pedal position. The clutch position sensor 52 is configured to generate a clutch position signal representative of the clutch pedal position. An accelerator pedal position sensor 54 senses the instantaneous position of an accelerator pedal 31. Although not necessary for clunk mitigation, the vehicle system 10 may include a brake pedal position sensor 56 that senses the position of a brake pedal 33. A body control module (BCM) 60 receives data from one or more control switches 62 and includes a data output to the ECM 30. The ECM 30 is in communication with the BCM 60 and therefore is capable of receiving data from the BCM 60. The ECM 30 (i.e., the controller) is in communication with the shift-linkage position sensor 40, the transmission output speed sensor 36, the accelerator pedal position sensor 54, and the clutch position sensor 52.

Figure 3:
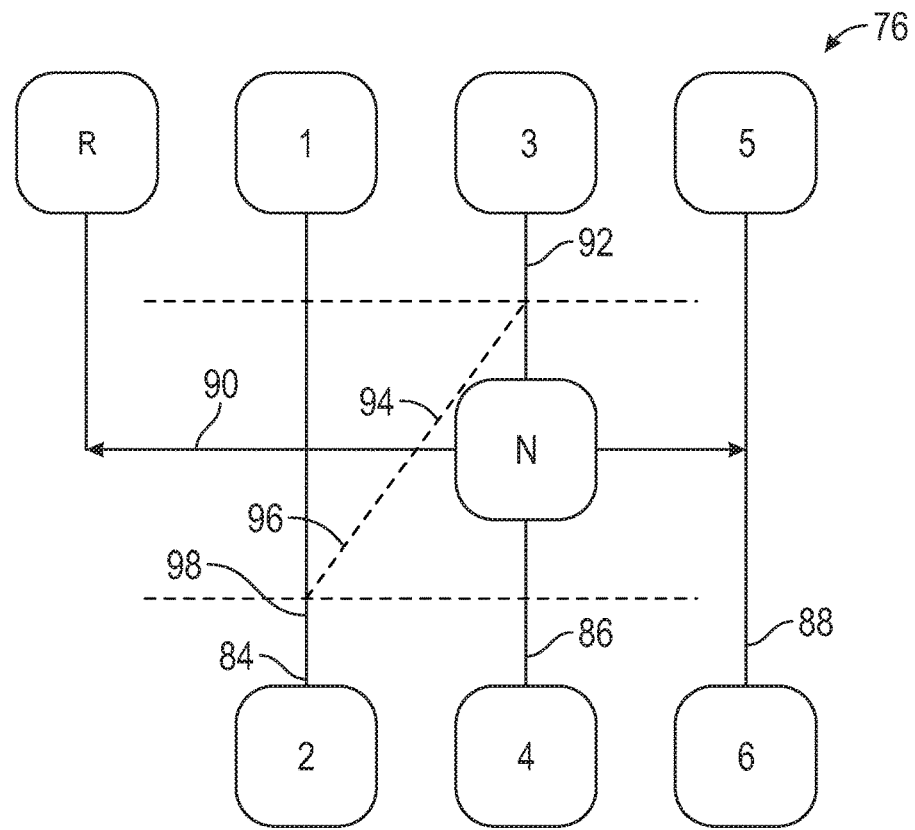
FIG. 3 is a plan view of a manual transmission shift gage ("H") pattern.

Referring now to FIGS. 2 and 3, a shift linkage 70 attached to the exterior of the housing 22 of the manual transmission 20 is shown. The shift linkage 70 includes a shift selector 72 (e.g., a shift lever) which terminates in a shift ball or handle 74 that is engaged and manipulated by the vehicle operator. The shift selector 72 is moveable through a virtual or actual shift gate or "H" pattern 76, illustrated in FIG. 3, which facilitates selection of, separates and creates tactile feedback for six forward gears or speed ratios and reverse. It should be understood, however, that the manual transmission 20 incorporate and provide more or fewer gear ratios or speed ratios. The shift selector 72 is disposed in a ball pivot 78 and coupled to a longitudinally oriented shaft 80 which is supported by various mounting members or brackets and bearings 82 which allow it to translate fore and aft and rotate about its axis.

FIG. 3 schematically shows an exemplary cross-gate down shift for the manual transmission 20 solely for illustrative purposes. In the present disclosure, upshift/downshift determination is not necessary for clunk mitigation. In this example, the manual transmission 20 includes, for example, third gear to second gear (regions 92, 94, 96 and 98), in which the vehicle system 10 assumes an upshift in the regions 92 and 94 and then assumes a downshift in the regions 96 and 98. An in-gate downshift generally includes one of: second gear to first gear 84, fourth gear to third gear 86, and sixth gear to fifth gear 88. The manual transmission 20 may also include a path 90 from neutral to reverse 90.

Figure 4:
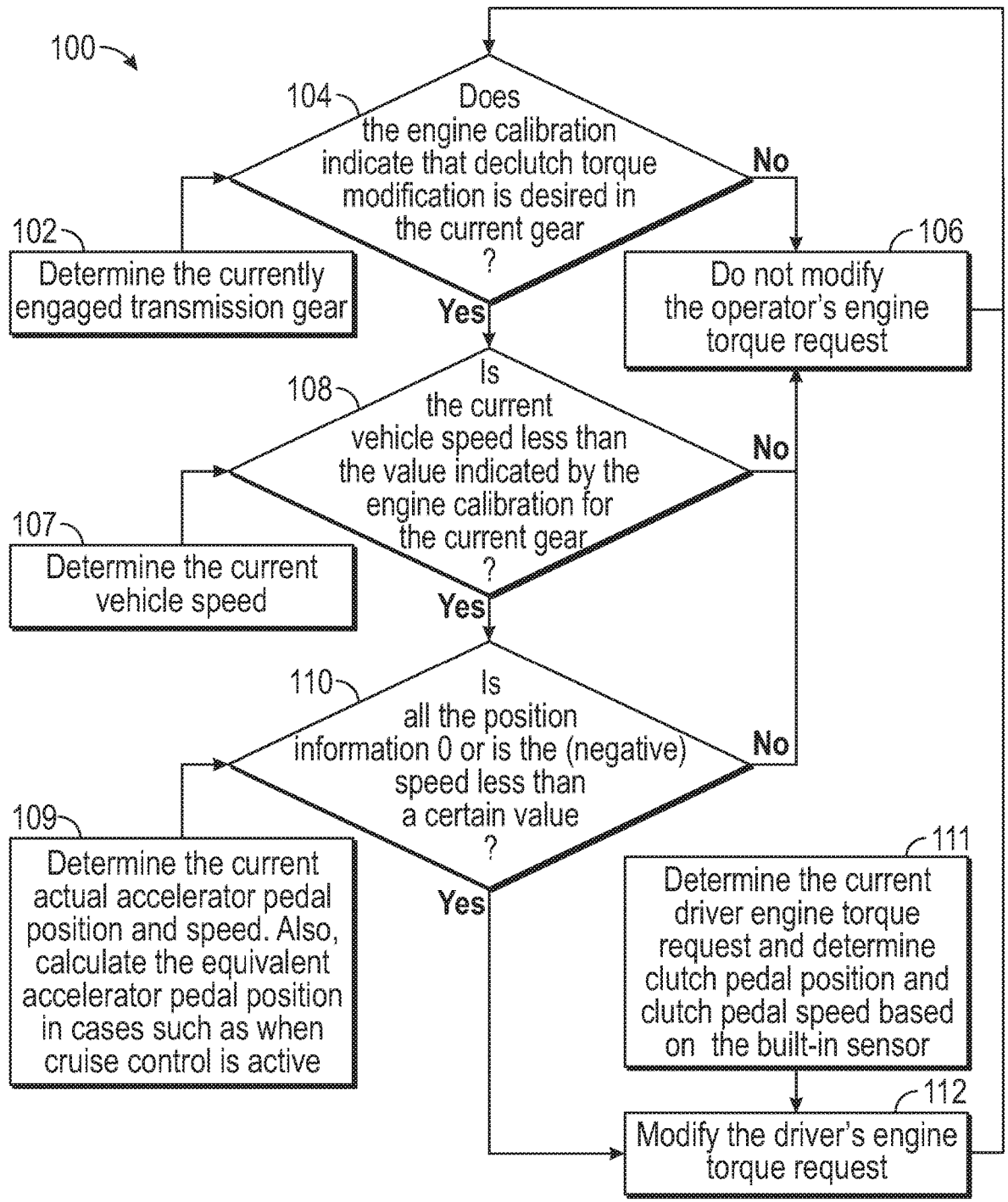
FIG. 4 is a flowchart of a method for mitigating clunk in a driveline of a vehicle system during a declutch event.

With reference to FIG. 4, the ECM 30 (i.e., the controller) is programmed to execute the method 100. By executing the method 100, the vehicle system 10 achieves a reduction in driveline torque to reduce stored potential energy prior to declutch. This reduction in stored potential energy mitigates change in angular momentum when clutch 16 (FIG. 1) opens, resulting in reduced levels of objectionable noise generation. Manual transmission vehicles, particularly performance oriented RWD configurations, have the capability to rapidly release potential energy stored in the driveline components as torsional "windup" via the driver opening the clutch abruptly. When such a maneuver occurs, the result is an objectionable clunk noise as the now unconstrained clutch assembly torsionally oscillates and impacts against the limits of the various gear lashes in the driveline, often several times per event. The method 100 involves torque intervention at the prime mover 12 when a maneuver that may result in such a clunk result is detected. By quickly reducing torque to a neutral state before the clutch 16 opens, the driveline 19 is given a chance to "unwind" while the clutch 16 is still constrained. Without any torque present across the clutch interface when the clutch 16 opens, there is no potential energy present to generate the clunk event.

The method 100 begins at step 102. At step 102, the ECM 30 determines a currently engaged transmission gear ratio of the manual transmission 20 based on the shift signal received from the shift-linkage position sensor 40. Alternatively or additionally, the ECM 30 may determine the currently engaged transmission gear ratio by dividing the current speed of the mover output shaft 14 of the prime mover 12 (as measured by the tachometer 32) by the instantaneous speed of the transmission output shaft 24 (as measured by the TOSS 36). Then, the method 100 proceeds to step 104.

At step 104, the ECM 30 compares the currently engaged transmission gear ratio with a predetermined gear ratio. The predetermined gear ratio may be determined through engine calibration and, for example, may be the first gear ratio and/or the second gear ratio of the manual transmission 20. In other words, the predetermined gear ratio, which is based on engine calibrations, determines whether declutch torque modification is desired in the currently engaged gear ratio. Declutch torque modification may be desired in lower gears (e.g., first gear and second gear), because the higher torque multiplication causes more clunk-causing energy to be stored in the driveline 19. If the ECM 30 determines that the currently engaged gear ratio is not equal to a predetermined gear ratio, then the method 100 returns to step 106. At step 106, the ECM 30 does not modify the operator's torque request. After step 106, the method 100 returns to step 104.

If and solely if the ECM 30 determines the currently engaged transmission gear ratio is equal to the predetermined gear ratio, then the method 100 proceeds to step 108.

Before step 108, however, the ECM 30 (at step 107) the current vehicle speed of the vehicle system 10 based on the shaft speed signal received from the TOSS 36. Alternatively or additionally, the ECM 30 may determine the current vehicle speed of the vehicle system 10 using wheel speed sensor, a global positioning system (GPS), among others. After step 107, the method 100 proceeds to step 108.

At step 108, the ECM 30 compares the current vehicle speed of the vehicle system 10 with a predetermined speed value. Specifically, at step 108, the ECM 30 determines whether the current vehicle speed is less than the predetermined speed value obtained through engine calibration for the currently engaged gear. Declutch torque modification may be desired at lower vehicle speeds, because this is where the clunk noise is most audible. If the current vehicle speed is not less than the predetermined vehicle speed, then the method 100 proceeds to step 106. However, if the and solely if the current vehicle speed of the vehicle system 10 is less than the predetermined speed value, then the method 100 proceeds to step 110. Before step 110, however, the ECM 30 executes step 109. At step 109, the ECM 30 determines an accelerator pedal position and a current accelerator pedal speed of the accelerator pedal 31 of the vehicle system 10 on a change of the accelerator pedal position over time. The ECM 30 determines the accelerator position based on data received from the accelerator position sensor 54. The ECM 30 may measure time using an internal clock. Alternatively at step 109, the ECM 30 calculates the equivalent accelerator pedal position in cases such as when cruise control is active. After step 109, the method 100 proceeds to step 110.

At step 110, the ECM 30 compares the accelerator pedal position of the accelerator pedal 31 of the vehicle system with a predetermined position value. The predetermined position value is zero to indicate that a vehicle operator has released the accelerator pedal 31 and the accelerator pedal 31 is not depressed from its neutral position. Also or alternatively at step 110, the ECM 30 compares the current accelerator pedal speed with a predetermined speed threshold, indicating that vehicle operator has released or is releasing the accelerator pedal 31. If the accelerator pedal position is not equal to the predetermined position value and/or the accelerator pedal speed is not less than the predetermined speed threshold, then the method 100 returns to step 106. However, if and solely if the accelerator pedal position is equal to the predetermined position value and/or the accelerator pedal speed is less than the predetermined speed threshold, then the method 100 proceeds to step 112. Before executing step 112, the ECM 30 executes step 111. At step 111, the ECM 30 determines a current torque request based on the accelerator pedal position of the accelerator pedal 31 of the vehicle system 10. Also at step 111, the ECM 30 determines the clutch pedal position based on the clutch position signal received from the clutch position sensor 52. Also at step 111, the ECM 30 determines a clutch pedal speed based on a change of the clutch pedal position over time. Then, after step 111, the method 100 proceeds to step 112.

At step 112, the ECM 30 modifies the current torque request to obtain a modified torque request as a function of the clutch pedal position and the clutch pedal speed (as shown in FIG. 5) such that a stored potential energy in the driveline 19 is minimized by a time that the clutch pedal 29 of the vehicle system 10 is disengaged during the declutch event of the manual transmission 20. In the present disclosure, the term "declutch event' means a moment when the clutch 16 is in the disengaged position and no torque is transmitted between the prime mover 12 and the manual transmission 20. As shown in FIG. 5, to modify the current torque request, the current torque request may be multiplied by a factor to obtain the modified torque request in order to minimize clunk noise. The factors may be obtained by testing and may be a function of clutch pedal speed and clutch pedal position. In the table shown in FIG. 5, the negative clutch pedal speed indicates the speed when the clutch pedal 29 is being pressed to disengage the clutch 16. In the table shown in FIG. 5, the positive clutch pedal speed indicates the speed when the clutch is being released to engage the clutch 16. Also at step 112, the ECM 30 controls the prime mover 12 (e.g., internal combustion engine or electric motor) to adjust its output torque in accordance with the modified torque request. To do so, the ECM 30 controls the operations of one or more mover actuators 13 that are capable of adjusting the output torque of the prime mover 12. As non-limiting examples, the mover actuators 12 may include a throttle 13a, one or more fuel injectors 13b, and/or spark plugs 13c. Thus, the ECM 30 may control the operation of the throttle 13a, the fuel injectors 13b, and/or spark plugs 13c such that the output torque of the prime mover 12 corresponds to the modified torque request. After executing step 112, the method 100 returns to step 104.

While the best modes for carrying out the teachings have been described in detail, those familiar with the art to which this disclosure relates will recognize various alternative designs and embodiments for practicing the teachings within the scope of the appended claims. The vehicle system 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A method for mitigating clunk in a driveline of a vehicle system during a declutch event, comprising:

determining a current torque request of a prime mover based on an accelerator pedal position of an accelerator pedal of the vehicle system, wherein the vehicle system includes an accelerator pedal position sensor coupled to the accelerator pedal to determine the accelerator pedal position;

determining a clutch pedal position based on a clutch position signal received from a clutch position sensor coupled to a clutch pedal of the vehicle system;

determining, via a controller, a clutch pedal speed based on a change of the clutch pedal position over time;

modifying, via the controller, the current torque request to obtain a modified torque request based on the clutch pedal position and the clutch pedal speed such that a stored potential energy in the driveline is minimized by a time that the clutch pedal of the vehicle system is disengaged during the declutch event of a manual transmission of the vehicle system; and controlling, via the controller, the prime mover to adjust an output torque thereof in accordance with the modified torque request.

2. The method of claim 1, further comprising:

determining a currently engaged transmission gear ratio;

comparing the currently engaged transmission gear ratio with a predetermined gear ratio;

determining, via the controller, that the currently engaged transmission gear ratio is the predetermined gear ratio; and in response to determining that the currently engaged transmission gear ratio is the predetermined gear ratio, modifying, via the controller, the current torque request to obtain the modified torque request.

3. The method of claim 2, wherein the manual transmission includes a plurality of gear ratios, the plurality of gear ratios includes a first gear ratio and a second gear ratio, the predetermined gear ratio is selected from a group consisting of the first gear ratio and the second gear ratio, and the first gear ratio is greater than the second gear ratio.

4. The method of claim 3, wherein the currently engaged transmission gear ratio is determined based on a shift signal received from a shift-linkage position sensor that is coupled to a shift selector of the manual transmission.

5. The method of claim 4, wherein the currently engaged transmission gear ratio is determined by dividing an engine speed of an internal combustion engine of the vehicle system by a transmission output shaft speed of a transmission output shaft of the manual transmission.

6. The method of claim 5, further comprising determining a current vehicle speed of the vehicle system.

7. The method of claim 6, further comprising:
comparing the current vehicle speed of the vehicle system with a predetermined speed value;
determining that the current vehicle speed of the vehicle system is less than a predetermined speed value; and
in response to determining that the current vehicle speed of the vehicle system is less than the predetermined speed value, modifying, via the controller, the current torque request to obtain the modified torque request.

8. The method of claim 7, further comprising determining, via the controller, a current accelerator pedal speed of the accelerator pedal of the vehicle system based on a change of accelerator pedal position over time.

9. The method of claim 8, further comprising:
comparing the current accelerator pedal speed with a predetermined speed threshold;
determining that the current accelerator pedal speed is less than the predetermined speed threshold; and
in response to determining that the current accelerator pedal speed is less than the predetermined speed threshold, modifying, via the controller, the current torque request to obtain the modified torque request.

10. The method of claim 9, further comprising:
comparing the accelerator pedal position of the accelerator pedal of the vehicle system with a predetermined position value, wherein the predetermined position value is zero to indicate that a vehicle operator has released the accelerator pedal and the accelerator pedal is not depressed from its neutral position; and
in response to determining that the accelerator pedal position is equal to the predetermined position value, determining, via the controller, a current accelerator pedal speed of the accelerator pedal of the vehicle system based on a change of accelerator pedal position over time.

11. The method of claim 1, further comprising:
determining a currently engaged transmission gear ratio;
comparing the currently engaged transmission gear ratio with a predetermined gear ratio;
determining, via the controller, that the currently engaged transmission gear ratio is the predetermined gear ratio, wherein the manual transmission includes a plurality of gear ratios, the plurality of gear ratios includes a first gear ratio and a second gear ratio, the predetermined gear ratio is selected from a group consisting of the first gear ratio and the second gear ratio, and the first gear ratio is greater than the second gear ratio, the currently engaged transmission gear ratio is determined based on a shift signal received from a shift-linkage position sensor that is coupled to a shift selector of the manual transmission;

determining a current vehicle speed of the vehicle system;
comparing, via the controller, the current vehicle speed of the vehicle system with a predetermined speed value;
determining that the current vehicle speed of the vehicle system is less than a predetermined speed value, wherein the current vehicle speed is determined based on a speed signal received from a transmission output shaft speed sensor that is coupled to the manual transmission;
determining, via the controller, a current accelerator pedal speed of the accelerator pedal of the vehicle system based on a change of accelerator pedal position over time;
comparing the current accelerator pedal speed with a predetermined speed threshold;
determining that the current accelerator pedal speed is less than the predetermined speed threshold;
determining, via the controller, a current accelerator pedal speed of the accelerator pedal of the vehicle system based on a change of accelerator pedal position over time; and
modifying, via the controller, the current torque request to obtain the modified torque request in response to determining that the currently engaged transmission gear ratio is the predetermined gear ratio, comparing the current vehicle speed of the vehicle system with a predetermined speed value, determining that the current vehicle speed of the vehicle system is less than a predetermined speed value, determining that the current accelerator pedal speed is less than the predetermined speed threshold.

12. A vehicle system, comprising:
a prime mover;
a driveline including a manual transmission coupled to the prime mover, wherein the prime mover includes a shift selector;
an accelerator pedal coupled to the prime mover;
an accelerator pedal position sensor configured to determine an accelerator pedal position of the accelerator pedal;
a clutch pedal coupled to the manual transmission;
a clutch position sensor coupled to the clutch pedal to determine a clutch pedal position;
a controller in communication with the prime mover, the accelerator pedal position sensor, and the clutch position sensor, wherein the controller is programmed to:
determine a current torque request based on the accelerator pedal position of an accelerator pedal of the vehicle system;
determine the clutch pedal position based on a clutch position signal received from the clutch position sensor;
determine a clutch pedal speed based on a change of the clutch pedal position over time;
modify the current torque request to obtain a modified torque request as a function of the clutch pedal position and the clutch pedal speed such that a stored potential energy in the driveline is minimized by a time that the clutch pedal of the vehicle system is disengaged during a declutch event of the manual transmission of the vehicle system; and control the prime mover to adjust an output torque thereof in accordance with the modified torque request.

13. The vehicle system of claim 12, wherein the controller is programmed to:

determine a currently engaged transmission gear ratio;

compare the currently engaged transmission gear ratio with a predetermined gear ratio;

determine that the currently engaged transmission gear ratio is the predetermined gear ratio; and in response to determining that the currently engaged transmission gear ratio is the predetermined gear ratio, modify the current torque request to obtain the modified torque request.

14. The vehicle system of claim 13, wherein the manual transmission includes a plurality of gear ratios, the plurality of gear ratios includes a first gear ratio and a second gear ratio, the predetermined gear ratio is selected from a group consisting of the first gear ratio and the second gear ratio, and the first gear ratio is greater than the second gear ratio.

15. The vehicle system of claim 14, wherein the controller is programmed to determine the currently engaged transmission gear ratio based on a shift signal received from a shift-linkage position sensor that is coupled to the shift selector of the manual transmission.

16. The vehicle system of claim 14, wherein the controller is programmed to determine the currently engaged transmission gear ratio by dividing an engine speed of an internal combustion engine of the vehicle system by a transmission output shaft speed of the manual transmission.

17. The vehicle system of claim 14, wherein the controller is programmed to:

determine a current vehicle speed of the vehicle system;

compare the current vehicle speed of the vehicle system with a predetermined speed value;

determine that the current vehicle speed of the vehicle system is less than a predetermined speed value; and in response to determining that the current vehicle speed of the vehicle system is less than the predetermined speed value, modify the current torque request to obtain the modified torque request.

18. The vehicle system of claim 17, wherein the controller is programmed to:

determine a current accelerator pedal speed of the accelerator pedal of the vehicle system based on a change of accelerator pedal position over time;

compare the current accelerator pedal speed with a predetermined speed threshold;

determine that the current accelerator pedal speed is less than the predetermined speed threshold; and in response to determining that the current accelerator pedal speed is less than the predetermined speed threshold, modify the current torque request to obtain the modified torque request.

19. A vehicle system, comprising:

a prime mover configured to provide propulsion to the vehicle system;

a driveline including a manual transmission coupled to the prime mover, wherein the manual transmission includes a plurality of gear ratios, the manual transmission includes a shift selector configured to select among the plurality of gear ratios of the manual transmission, and the plurality of gear ratios includes a first gear ratio, a second gear ratio, a third gear ratio, a fourth gear ratio, and a fifth gear ratio, and the first gear ratio is greater than the second gear ratio, and the manual transmission includes a transmission output shaft;

a shift-linkage position sensor coupled to the shift selector of the manual transmission such that the shift-linkage position sensor is configured to determine a currently engaged gear ratio of the plurality of gear ratios, wherein the shift-linkage position sensor is configured to generate a shift signal representative of the currently engaged gear ratio of the manual transmission;

a transmission output speed sensor coupled to the transmission output shaft of the manual transmission such that the transmission output speed sensor is configured to monitor and measure a shaft speed of the transmission output shaft of the manual transmission, wherein the transmission output speed sensor is configured to generate a shaft speed signal representative of the shaft speed of the transmission output shaft and a current vehicle speed of the vehicle system;

a clutch coupled between the prime mover and the manual transmission, wherein:

the clutch is movable between an engaged position and a disengaged position;

in the engaged position, the clutch interconnects the prime mover to the manual transmission such that torque is transmitted from the prime mover to the manual transmission; and in the disengaged position, the clutch decouples the prime mover from the manual transmission such that no torque is transmitted between the prime mover and the manual transmission;

an accelerator pedal coupled to the prime mover;

an accelerator pedal position sensor coupled to the accelerator pedal such that the accelerator pedal position sensor is configured to determine an accelerator pedal position of the accelerator pedal;

a clutch pedal coupled to the clutch, wherein actuation of the clutch pedal causes the clutch to move between the disengaged position and the engaged position;

a clutch position sensor coupled to the clutch pedal such that the clutch position sensor is configured to determine a clutch pedal position, wherein the clutch position sensor is configured to generate a clutch position signal representative of the clutch pedal position;

a controller in communication with the shift-linkage position sensor, the transmission output speed sensor, the accelerator pedal position sensor, and the clutch position sensor, wherein the controller is programmed to:

determine a currently engaged transmission gear ratio on the shift signal received from the shift-linkage position sensor;

compare the currently engaged transmission gear ratio with a predetermined gear ratio, wherein the predetermined gear ratio is at least one of the first gear ratio and the second gear ratio;

determine that the currently engaged transmission gear ratio is the predetermined gear ratio;

determine the current vehicle speed of the vehicle system based on the shaft speed signal received from the transmission output speed sensor;

compare the current vehicle speed of the vehicle system with a predetermined speed value;

determine that the current vehicle speed of the vehicle system is less than the predetermined speed value;

determine a current accelerator pedal speed of the accelerator pedal of the vehicle system based on a change of the accelerator pedal position over time;
compare the current accelerator pedal speed with a predetermined speed threshold;
determine that the current accelerator pedal speed is less than the predetermined speed threshold;
determine a current torque request based on the accelerator pedal position of the accelerator pedal of the vehicle system;
determine the clutch pedal position based on the clutch position signal received from the clutch position sensor;
determine a clutch pedal speed based on a change of the clutch pedal position over time; and
modify the current torque request to obtain a modified torque request as a function of the clutch pedal position and the clutch pedal speed such that a stored potential energy in the driveline is minimized by a time that the clutch pedal of the vehicle system is disengaged during a declutch event of the manual transmission of the vehicle system in response to:
   determining that the currently engaged transmission gear ratio is the predetermined gear ratio;
   determining that the current vehicle speed of the vehicle system is less than the predetermined speed value; and
   determining that the current accelerator pedal speed is less than the predetermined speed threshold; and
control the prime mover to adjust an output torque thereof in accordance with the modified torque request.

\* \* \* \* \*